(12) United States Patent
Okamoto et al.

(10) Patent No.: US 7,015,651 B2
(45) Date of Patent: Mar. 21, 2006

(54) LIGHT SOURCE DEVICE HAVING A DISCHARGE LAMP WITH HIGH RADIANCE AND A CURRENT FEED CONTROLLER

(75) Inventors: Masashi Okamoto, Hyogo-ken (JP); Yukiharu Tagawa, Hyogo-ken (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/437,227

(22) Filed: May 14, 2003

(65) Prior Publication Data

US 2003/0214253 A1    Nov. 20, 2003

(30) Foreign Application Priority Data

May 15, 2002   (JP) ............................. 2002-139887

(51) Int. Cl.
*H05B 37/02* (2006.01)

(52) U.S. Cl. .................. 315/224; 315/209 R; 315/291; 315/360

(58) Field of Classification Search ............... 315/224, 315/209 R, 291, 307, 360, 287, DIG. 1, DIG. 2, 315/DIG. 5, DIG. 7
See application file for complete search history.

(56) References Cited

U.S. PATENT DOCUMENTS

| 4,240,009 | A | * | 12/1980 | Paul ........................... 315/224 |
| 4,289,993 | A | * | 9/1981 | Harper et al. ................ 315/311 |
| 5,319,286 | A | * | 6/1994 | Leyten ........................ 315/289 |
| 5,705,896 | A | * | 1/1998 | Choi ........................... 315/307 |
| 6,049,179 | A | * | 4/2000 | Kisaichi et al. ............. 315/307 |
| 6,313,586 | B1 | * | 11/2001 | Yamamoto et al. .......... 315/224 |

FOREIGN PATENT DOCUMENTS

JP          3261142        12/2001

\* cited by examiner

*Primary Examiner*—Tuyet Thi Vo
(74) *Attorney, Agent, or Firm*—David S. Safran (57) ABSTRACT

To eliminate the disadvantage that the lamp current becomes large in a light source device with a discharge lamp with high radiance in a lamp with a low saturation lamp voltage, in a light source device having a discharge lamp with a pair of opposed electrodes connected to a feed device which starts the discharge lamp and which is used to supply the discharge current to the electrodes, the feed device is made to control the current feed such that the current flowing in the discharge lamp does not exceed a given current boundary value, such that, during the interval immediately after starting of the discharge lamp until sufficient heating of the discharge lamp is achieved, the current boundary value is a first boundary value, and that, after the interval expires, the current boundary value is changed to a second boundary value that is smaller than the first boundary value.

3 Claims, 6 Drawing Sheets

LIGHT SOURCE DEVICE HAVING A DISCHARGE LAMP WITH HIGH RADIANCE AND A CURRENT FEED CONTROLLER

BACKGROUND OF THE INVENTION

1. Field of the Invention

The invention relates to a light source device using a high pressure mercury discharge lamp which is used, for example, as the light source for an optical device, such as a projector or the like, or using a discharge lamp with high radiance (HID lamp), such as a metal halide lamp or the like.

2. Description of Related Art

In a light source device for an optical device, such as a liquid crystal projector, a DLP™ projector (Texas Instruments) or the like, a discharge lamp with high radiance is used.

In the case of operating this type of discharge lamp, in the state where a voltage is applied to the lamp, which is called the no-load voltage, the no-load voltage is combined with a high voltage, by which an insulation breakdown is produced in the discharge space, and a transition from a glow discharge to an arc discharge takes place. The relation between the lamp voltage (VL) and the lamp current (IL) after the transition into the arc discharge is described below in relation to FIG. 7.

Directly after the transition to an arc discharge the lamp voltage is a low voltage of for example roughly 10 V. If the attempt is made to supply a nominal wattage to the lamp starting at this instant, an overly large current must be allowed to flow. Normally, therefore, as is shown using the point (P01) in FIG. 7, the circuit of a feed device is controlled such that only one lamp current flows wherein the current is smaller than the current boundary value (IL0) of a certain value. The lamp voltage, which is low immediately after the transition to an arc discharge, increases according to the temperature increase of the lamp, and causes a transition in the manner shown using the arrow (Y01) until the nominal wattage can be supplied to the lamp by a lamp current within the range of the current boundary value (IL0) in the manner shown using point (P02).

Figure 7:
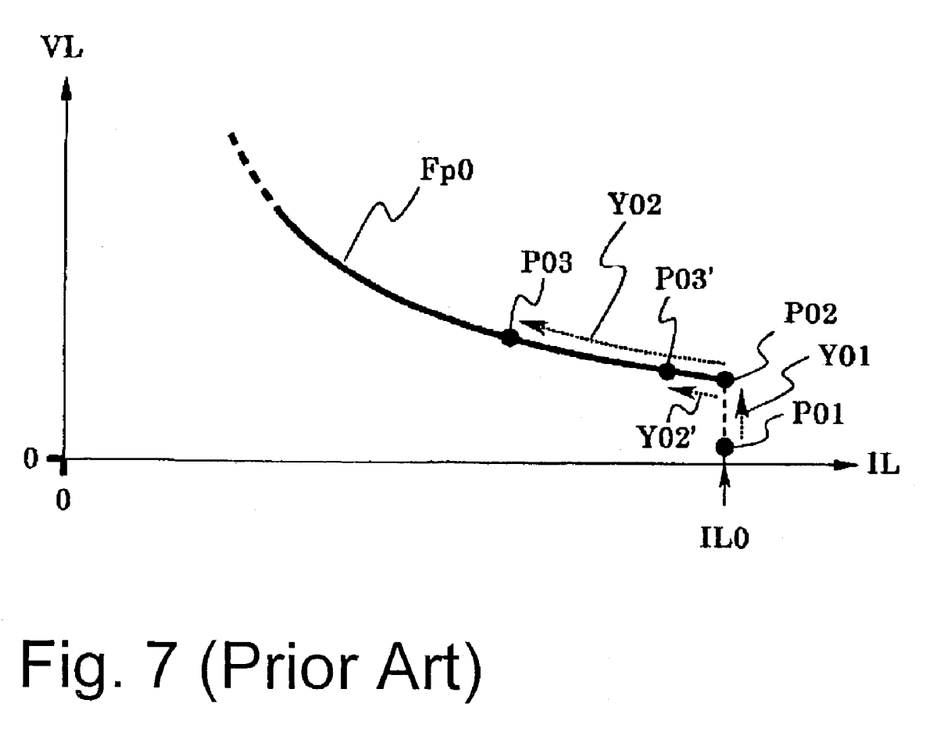
FIG. 7 shows a schematic of the relation between the lamp voltage and the lamp current of a conventional light source device.

In FIG. 7, the constant wattage characteristic (Fps0) shows the condition under which the wattage to be supplied to the lamp becomes identical to the nominal wattage, i.e., the condition under which the product of the lamp voltage (VL) and the lamp current (IL) becomes constant. In the range where the lamp current is less than the current boundary value (IL0), the circuit of the feed device is controlled such that the ratio between the lamp voltage (VL) and the lamp current (IL) is essentially above the constant wattage characteristic (Fp0).

If the lamp temperature continues to increase, along the constant wattage characteristic (Fp0) a transition takes place, as shown using the arrow (Y02), until finally the increase of the lamp voltage does not proceed any farther, by which the state of a saturation voltage shown using the point (P03) is reached.

Also, the current boundary value (IL0) is inherently a high current. Since the heat generation of the power elements, such as the switching devices, such as FETs or the like, comprising the feed device, semiconductor elements such as diodes or like, coils like reactance coils or the like and similar elements, is large, the feed device may not be able to withstand a constant flow of this lamp current. However, since, as described above, the flow of this high current is limited to a short time until the lamp voltage rises and is saturated, it is normally not considered disadvantageous.

Since, on the other hand, the lamp current which flows after reaching the saturation voltage is of a constant nature, there is a disadvantage if it is large, as in the case shown using the point (P03'). This condition arises in a lamp with a low saturation lamp voltage.

Since recently the degree of utilization of the light emitted from the discharge lamp has been increasing more, the more the light source has approached a point light source, there is more and more a demand for shortening the distance between the electrodes of the discharge lamp in order to reduce the size of the emission area of the discharge lamp. However, if, as described above, the distance between the electrodes is shortened, the amount of influence exerted by the deviation from the normal value of the electrode distance which arises due to processing inaccuracies in lamp manufacture, as a result of thermal expansion during lamp operation, as a result of the transport phenomenon of the electrode material and the like, on the saturation voltage of the above described lamp voltage, becomes stronger than in the conventional case of a long distance between the electrodes.

The reason for this is as follows:

In a lamp where the normal value of the electrode distance is 2 mm, the variance in a processing error of for example ±0.2 mm is at most ±10%. However, in a lamp in which the normal value of the electrode distance is 0.8 mm, the variance is ±5%. Since the saturation lamp voltage is essentially proportional to the dimension of the distance between the electrodes, the percentage of this variance of dimension is unchanged to the percentage of variance of the saturation lamp voltage.

If it is assumed that the parameters of the lamp, such as the fill pressure during operation, for example, is set such that in a lamp with a normal value of the electrode distance of 2 mm and in a lamp with a normal value of the electrode distance of 0.8 mm the saturation lamp voltage in the case in which the dimension of the distance between the electrodes has a normal value, i.e. the normal lamp voltage, reaches the same value, for example, 70 V, the lamp voltage under the condition under which the lamp voltage has the minimum value, i.e., in the case of an error of the electrode distance of −0.2 mm in the lamp with the normal value of the electrode distance of 2 mm is 63 V and for a lamp with the normal value of the electrode distance of 0.8 mm, is 52.5 V.

As described above, in one such light source device, the feed device is made such that the wattage to be supplied to the lamp is also essentially constant when the lamp voltage changes. The lower the lamp voltage, the greater the lamp current which must be allowed to flow. If it is assumed, for example, that the nominal wattage of the lamps with the normal values of the electrode distance of 2 mm and 0.8 mm is the same value, for example, 200 W, the respective maximum current in the lamp with the normal value of the electrode distance of 2 mm (with a minimum lamp voltage of 63 V) is 3.17 A and in the lamp with the normal value of 0.8 mm (with a minimum lamp voltage of 52.5 V) it is 3.81 V. If the construction of the lamp is fixed, from the standpoint of reliable and at the same time stable use of the lamp, the nominal lamp wattage is also determined. With respect to a condition with such great variances there is however neither the nominal lamp voltage nor the nominal lamp current.

The loss of the power elements comprising the feed device generally increases in proportion to the square of the flowing current. If the loss of the feed device during operation of the above described lamp with a normal value of the electrode distance of 2 mm at a minimum voltage, i.e., maximum loss, is for example 10 W, in the case of a lamp with a normal value of the electrode distance of 0.8 mm, the maximum loss is roughly 14 W.

In the case in which the normal value of the electrode distance of 2 mm is reduced to 0.8 mm, it becomes apparent that, as a result of a processing fault in the electrode distance, the maximum lamp current increases and that the maximum loss increases by 44%, even if the lamp is built such that the normal lamp voltage does not change. There is, therefore, the disadvantage that the heat generation of the above described power elements comprising the feed device increases. To reduce this disadvantage, it is necessary to use larger switching devices, diodes, coils and the like, to increase the size of the cooling rib or to reinforce it. Hence, an increase in size and weight of the optical device and an increase in cost become inevitable.

To eliminate this disadvantage, a method is devised in which even in a lamp with a low saturation lamp voltage the above described current boundary value (IL0) is set to be small, wherein the amount at which heat generation of the above described power elements is not regarded as disadvantageous. In this case there, however, the disadvantage of the time consumption for start-up to reaching practical radiance of the lamp is great. Furthermore, this measure resulted in the disadvantage that the phenomenon often occurs where the radiance spot of the arc discharge is not stabilized such that flickering occurs. There is specifically the disadvantage that so-called flickering often forms. The reason for this is that, due to this measure, a transition to stable operation takes place when the lamp is not adequately heated up at the nominal wattage, and that the vaporization of the substance filling the lamp, for example mercury or the like, is incomplete. This measure can, therefore, not be regarded as a genuine solution.

Japanese patent 3261142 describes a device for operating a discharge lamp in which use of a winding with a large winding diameter such as a coil or the like can be avoided. The following measures are used in the reference:

A time is set by a timer circuit which is necessary for the lamp voltage to reach essentially the nominal lamp voltage at least immediately after starting of the discharge lamp with high radiance.

Until this time expires, the time up to a stable amount of light is shortened by high current flow as the nominal lamp current.

In the case after this time expires the lamp voltage does not reach the nominal voltage, a DC-DC converter circuit of the voltage increasing chopper type is controlled such that a current smaller than the lamp current which can maintain the nominal operating state flows.

In this device for operating a discharge lamp, the time necessary for the lamp voltage to reach essentially the nominal lamp voltage is set by the timer circuit. In the above described case in which the dimension of the distance between the electrodes of the lamp inherently has variances, in the lamp characteristic and in the time behavior of the lamp, there are variances due to the fact that variances of the amount of filler substance, such as mercury or the like; and, variances of the cooling conditions of the optical device and the ambient temperature are added to the above described variances. Thus, for the time in which the nominal wattage is to be supplied, major variances arise. Therefore, the time in which a high lamp current is intentionally allowed to flow cannot be determined beforehand. For example, the degree of the wattage which exceeds an allowable value was too great, resulting in the danger that the lamp service life is shortened or breakage occurs.

The object of this device for operating a discharge lamp is to exactly distinguish from one another a normal lamp and a lamp in which there has been a slow leak and to prevent an overly large current from continuing to flow in a lamp in which there was a slow leak and in which a fault has occurred. Therefore, this device is not used to normally operate a lamp which is indeed normal but which has great variances, and, therefore, a high current is conveyed, in a manner which corresponds to these variances to make it usable.

SUMMARY OF THE INVENTION

Therefore, an object of the invention is to eliminate the above-mentioned disadvantages of the prior art of a light source device with a discharge lamp with high radiance in a lamp with a low lamp saturation voltage wherein the lamp current becomes large.

In a first aspect of the invention, there is a light source device having a discharge lamp. The discharge lamp includes a pair of opposed electrodes connected to a feed device, which starts the discharge lamp and is used to supply the discharge current to the electrodes. The feed device is made to control the current feed such that the current flowing in the discharge lamp does not exceed a given current boundary value during the interval immediately after starting of the discharge lamp until sufficient heating of the discharge lamp is achieved. The current boundary value reaches a first boundary value, and after the above described interval expires, the current boundary value is changed to a second boundary value that is smaller than the first boundary value.

A second aspect of the invention is that when the current boundary value changes from the first boundary value to the second boundary value, the change is carried out as a gradual change of the boundary value.

A third aspect of the invention relates to a feed device with the same arrangement as in the above-described aspects of the invention.

The advantages of the invention are described below. The shortening of the distance between the electrodes of the discharge lamp is therefore carried out in order to increase the degree of light utilization and to obtain a bright optical device. The invention is especially effective, for example, in a light source device using a discharge lamp with high radiant efficiency which contains greater than or equal to 0.15 mg mercury per cubic millimeter of volume of the discharge space, or using a discharge lamp with a high degree of light utilization in which the distance between the electrodes is less than or equal to 1.5 mm.

The invention is further described below using several embodiments shown in the drawings.

BRIEF DESCRIPTION OF THE DRAWINGS

FIGS. 4a and b each shows a schematic of the operation of the voltage reducing chopper circuit of the feed device of the light source device of the invention;

DETAILED DESCRIPTION OF THE INVENTION

Figure 1:
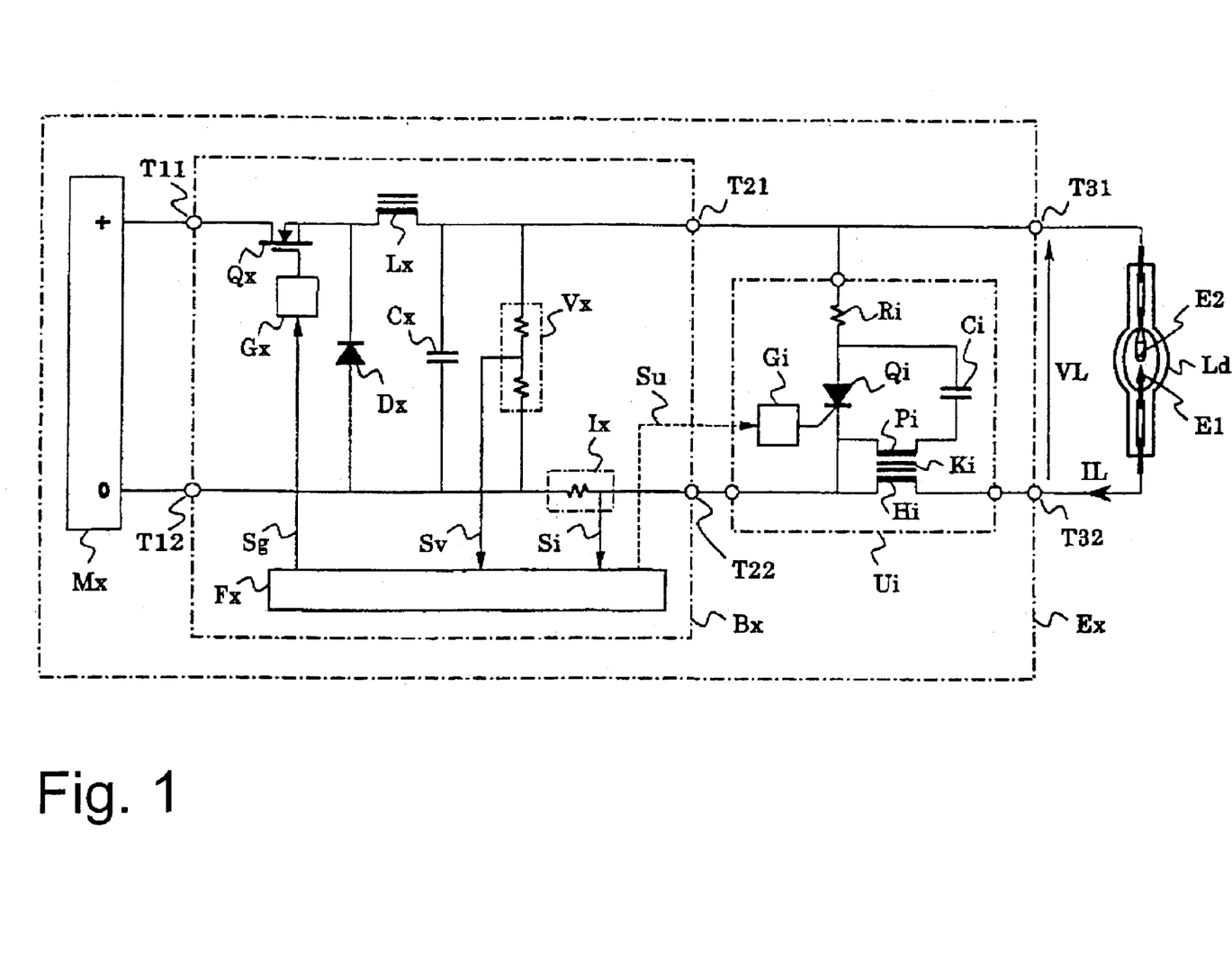
FIG. 1 shows a schematic of the arrangement of the light source device of the invention.

In FIG. 1, terminals are labeled as T11, T12, T22, T23, T31, and T32. FIG. 1 is a schematic of a simplified example of the arrangement of a light source device of the invention which is discharged by applying a DC voltage to the discharge lamp (Ld). Reference letters Ex label a feed device in which a ballast circuit (Bx) of the voltage reducing chopper type is operated by receiving a voltage from a DC source (Mx) such as a PFC (power factor corrector) or the like. In the ballast circuit (Bx) a switching device (Qx), such as a FET or the like, turns on and off the current from the DC source (Mx), and a smoothing capacitor (Cx) is charged via the reactance coil (Lx). This voltage is applied to the discharge lamp (Ld). Thus, current can be allowed to flow in the discharge lamp (Ld).

During the interval in which the switching device (Qx) is in the ON state, charging of the smoothing capacitor (Cx) and feeding of a current to the discharge lamp (Ld), i.e., the load, are carried out immediately by the current through the switching device (Qx). Moreover, in the reactance coil (Lx) energy is stored in the form of a current. During the interval in which the switching device (Qx) is in the OFF state, the smoothing capacitor (Cx) is charged via a diode (Dx) by the energy stored in the reactance coil (Lx) in the form of current, thereby the current is supplied to the discharge lamp (Ld).

In a discharge lamp starter (Ui) circuit, hereinafter starter (Ui), a capacitor (Ci) is charged by a voltage equal the lamp voltage (VL) via a resistor (Ri). When a gate driver circuit (Gi) is activated, a switching device consisting of a thyristor Qi or the like is closed. In this way, the capacitor (Ci) is discharged via the primary winding (Pi) of a transformer (Ki) and on the secondary winding (Hi) where a high voltage pulse is formed.

The high voltage pulse formed on the secondary winding (Hi) of the starter (Ui) is superimposed by the output voltage of the above described ballast circuit (Bx) and is applied between the electrodes (E1, E2). In the gap between the electrodes (E1, E2) of the discharge lamp (Ld), an insulation breakdown is thus produced, and the discharge is started.

The feed control circuit (Fx) generates a gate driver signal (Sg) which has a certain pulse duty factor and which is supplied via a gate driver circuit (Gx) to the gate terminal of the switching device (Qx). In this way, the turning of the current from the DC source (Mx) between on and off states is controlled.

The lamp current (IL) flowing between the electrodes (E1, E2) of the discharge lamp (Ld) and the lamp voltage (VL) arising between the electrodes (E1, E2) can be determined by a current determination means (Ix) and a voltage determination means (Vx). The current determination means (Ix) can be easily built using, for example, a shunt resistor, and the voltage determination means (Vx) using a resistor divider.

The lamp current signal (Si) of the current determination means (Ix) and the lamp voltage signal (Sv) from the voltage determination means (Vx) are transferred to the feed control circuit (Fx). Based on the difference between the discharge states of the discharge lamp (Ld) at this instant, i.e., whether the discharge lamp (Ld) is in the none discharge state, in the glow discharge state or in the arc discharge state, the pulse duty factor of the gate driver signal (Sg) is controlled by feedback such that the lamp current (IL) and the lamp voltage (VL) or the lamp wattage as the product of this current and this voltage has a reduced difference from its setpoint.

As described for the aforementioned prior art, the lamp voltage is low directly after the transition into the arc discharge. To prevent the lamp current from becoming overly large if the attempt is made to supply the nominal wattage to the lamp starting at this instant, the feed control circuit (Fx) sets the current boundary value to a first boundary value (IL1) before starting the lamp.

Figure 2:
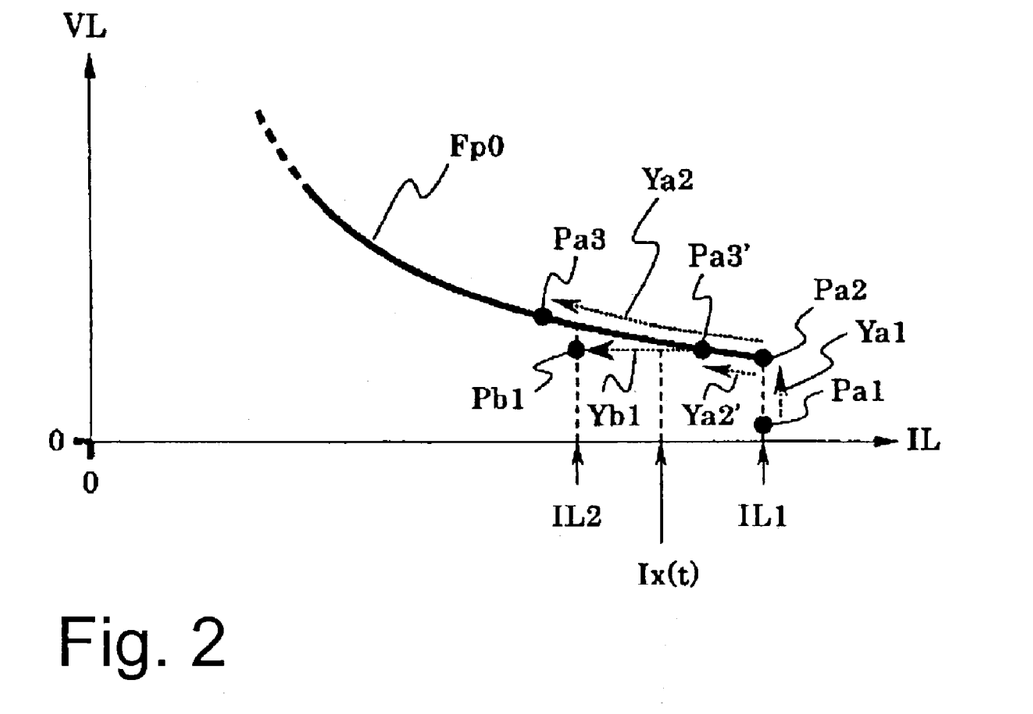
FIG. 2 shows a schematic of the relation between the lamp voltage and the lamp current of the light source device of the invention.

As a result, the lamp current is limited to the first boundary value (IL1), as is shown using the point (Pa1), directly after high voltage has been applied to the lamp, and in the discharge space an insulation breakdown has been produced, and after a transition to an arc discharge has taken place via a glow discharge.

The lamp voltage which is low immediately after the transition to an arc discharge increases together with the temperature increase of the lamp and carries out the transition shown using the arrow (Ya1) until it becomes possible, as shown using the point (Pa2), to supply the nominal wattage to the lamp by the lamp current within the area of the current boundary value.

If the lamp temperature continues to increase, along the constant voltage characteristic (Fp0) a transition takes place. This is shown using the arrow (Ya2) or the arrow (Ya2'). In the stage in which the lamp has been sufficiently heated up, the location shown using the point (Pa3) or the point (Pa3') is reached. At this time the feed control circuit (Fx) changes the above described current boundary value to a second boundary value (IL2).

For example, a process for determining the lamp temperature, a process for determining the amount of light of the lamp, a process for determining the color temperature of the lamp emission, a process using the ratio of the amount of light of two certain wavelengths of the lamp emission, and similar processes can be used as the process for assessment by the feed control circuit (Fx) to determine whether the lamp has been sufficiently heated up or not. Besides this process in which an apparatus for determining the temperature and the light and the like is used, a process for assessment by measurement, for example, of the degree of change of the lamp voltage can be used such that these determination apparatuses are not necessary. Further, a process based on the time passed since occurrence of certain events like the instant of lamp starting, the instant of transition into the arc discharge, the instant at which the lamp voltage has reached as certain value, the instant at which the lamp wattage has reached a certain value, and the like, and similar processes, can be used.

In the case where the lamp is in the state in which the lamp current shown using the point (Pa3) is less than or equal to the second boundary value (IL2), as a result of the change of the current boundary value to the second boundary value (IL2), no change occurs. However, if the lamp is in the state in which the lamp current shown using the point (Pa3') is greater than the second boundary value (IL2), by changing the current boundary value to the second boundary value (IL2), movement which is shown using the arrow (Yb1) to the point (Pb1) takes place, and the lamp current is limited to the second current value (IL2).

The second boundary value (IL2) can be adjusted with respect to the lamp current to a current value at which the temperature increase of the power elements, such as the switching devices (Qx), the semiconductor elements such as the diodes (Dx) or the like, the coils such as the reactance coils (Lx) or the like, and similar elements so as to be within tolerance, even for a constant lamp current with this value. Furthermore, the first boundary value (IL1) with respect to the lamp current within a limited time immediately after starting the discharge lamp until the change of the current boundary value can be limited to the second boundary value (IL2) and can be set to current value at which the temperature increase of the power elements is within tolerance.

The advantages are, by the fact that during the interval up to reaching sufficient heating of the discharge lamp the first boundary value (IL1) is set to be greater than the second boundary value (Il2), are as follows: First, this measure accelerates the heating of the lamp during this time and that as a result it is possible to contribute to shortening as much as possible the time necessary for starting of the lamp radiance up to a practicable radiance.

Second, this measure makes it possible for the lamp to receive the nominal wattage in the movement towards the above described point (Pb1) at which the lamp wattage is smaller than the nominal wattage for some time on the constant wattage characteristic (Fp0). In this way, the vaporization of the material filling the lamp, such as, for example, mercury or the like, becomes more complete, as are similar effects by which it is possible to the probability of formation lamp flickering which is caused by the fact that the lamp wattage after the transition to the above described point (Pb1) is less than the nominal wattage.

Therefore, with respect to the question relating to what kind of state sufficient heat-up of the discharge lamp indicates, the following interpretation can be made:

In a lamp in which the lamp wattage moves to the above described point (Pb1) where it is smaller than the nominal wattage, the result is that the heating of the discharge lamp until starting of the movement to the above described point (Pb1) was sufficient, if the probability of formation of flickering after movement to the point (Pb1) is small in practice.

This means that the lower boundary of the amount of heating at which the heating of the discharge lamp can be kept sufficient has a certain width. It can be adjusted with play.

By the arrangement of the light source device in the above described manner, in the light source device of the invention, it is possible to prevent the probability of the formation of flickering from increasing, even if the saturation lamp voltage is low in the lamp used, for example, as a result of variances of the electrode distance. Thus, the lamp current in steady-state operation can be limited to less than or equal to the second boundary value (IL2), and it is possible to prevent the lamp current from increasing. As a result, the temperature increase of the power elements is suppressed to within an allowable range, by which the increase in the size of the above described power elements and the cooling rib as well as the intensification of the cooling are no longer necessary, and by which, thus, an increase in size and weight and a cost increase of the optical device can be avoided.

In the case of movement from the point (Pa3) to the point (Pb1), the lamp wattage is below the constant wattage characteristic (Fp0), by which the lamp wattage falls below the nominal wattage. There may indeed be a fear that the amount of light is reduced. However, there is the advantage that the light intensity of the optical device is not reduced even by the above described amount of reduction of the lamp wattage with respect to the nominal value because, in one such lamp with a low voltage, the dimension of the distance between the electrodes is small, because the discharge emission area of the lamp becomes smaller than in the lamp corresponding to the point (Pa3) with a high voltage, in other words, in a lamp with a large distance between the electrodes, and because the degree of utilization of the light radiated by the discharge lamp increases.

The first and the third aspect of the invention is described below. FIG. 2 shows the relation between the lamp voltage (VL) and the lamp current (IL) after the transition into the arc discharge. The feed control circuit (Fx) carries out control such that, when the pulse duty factor of the gate driver signal (Sg) is controlled, the lamp current (IL) does not exceed the current boundary value stored within the feed control circuit (Fx). The lamp current (IL) is controlled such that in the area in which it does not exceed the current boundary value, the wattage to be supplied to the lamp becomes identical to the nominal wattage value, i.e., this wattage is above the constant wattage characteristics (Fp0) in FIG. 2.

The invention is described below according to the second aspect of the invention. As discussed above, by the movement of the point (Pa3') to the point (Pb1), the lamp voltage has decreased but the light intensity of the optical device is not reduced even by the amount of reduction of the lamp wattage with respect to the nominal value. The amount of reduction of the light intensity here depends on the arrangement of the optical system of the optical device. Furthermore, since human eyes in general are sensitive to rapid changes of radiance, even if the amount of change is small, the user of the optical device, such as, for example, the observer of the projection images of a projector wherein the movement from the point (Pa3') to point (Pb1) takes place instantaneously, can detect that the images are suddenly darkening, which is perceived as unpleasant.

According to second aspect of the invention, the motion from point (Pa3') to point (Pb1) takes place slowly because when the current boundary value changes from the first boundary value to the second boundary value the boundary value is changed by a gradual change. The user of the optical device can therefore not detect that the radiance has changed. Thus, the disadvantage of an unpleasant perception of sudden darkening of images can be avoided.

Figure 3:
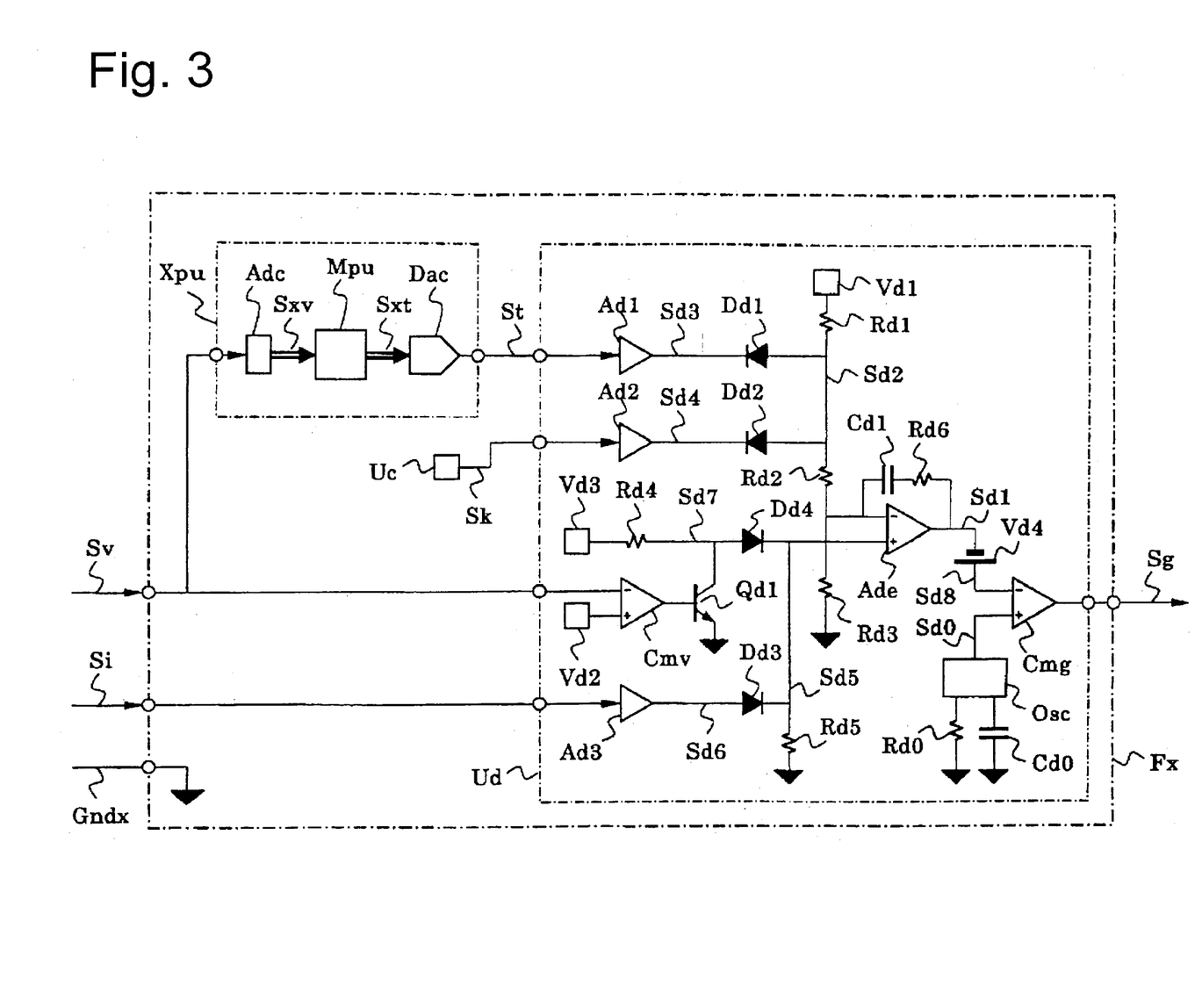
FIG. 3 shows a schematic of one example of the arrangement of a feed control circuit of a feed device of the light source device of the invention.

FIG. 3 schematically shows the arrangement of the feed control circuit (Fx) described in FIG. 1 in a simplified representation.

In FIG. 3, the lamp voltage signal (Sv) is input into an A/D converter (Adc) in the overall control element (Xpu), and is converted into digital lamp voltage data (Sxv) with a suitable number of resolution. Then, the voltage data is input into a microprocessor unit (Mpu), which comprises a CPU, a program memory, a data memory, a circuit for producing a clock pulse, a time counter, an I-O controller for input and output of a digital signal and the like, and which, based on the computations in which the above described lamp voltage data (Sxv), are taken as a reference. Based on the assessment of the conditions which correspond to the state of the system at this instant, setpoint data for control of the chopper capacity (Sxt) are generated for the chopper capacity control circuit (Ud) described below. The above described setpoint data for control of the chopper capacity (Sxt) are converted by a D/A converter (DAC) into analog setpoint signals (St)

for control of the chopper capacity and are input into the chopper capacity control circuit (Ud).

Furthermore, the upper boundary signal (Sk) of the lamp current used for fixing the uppermost boundary value Ilmax of the allowable lamp current (IL) is produced by a circuit (Uc) for producing the upper boundary signal of the lamp current and is input into the chopper capacity control circuit (Ud).

The circuit (Uc) for producing the upper boundary signal of the lamp current can be formed most easily such that the uppermost value of the lamp current called Ilmax and that the upper boundary signal (Sk) of the lamp current are produced which corresponds to a first boundary value (IL1) of the above described lamp current.

In the chopper capacity control circuit (Ud), the setpoint signal (St) for control of the chopper capacity is connected to one end of a pull-up resistors (Rd1) at a time via an amplifier or a buffer (Ad1), which is installed if necessary, and via a diode (Dd1). Furthermore, the upper boundary signal (Sk) of the lamp current is connected to one end of a pull-up resistor (Rd1) at a time via an amplifier or a buffer (Ad2), which is installed if necessary, and via a diode (Dd2), by which the setpoint signal (Sd2) is produced for chopper driving. The other end of the pull-up resistor (Rd1) is connected to a reference voltage source (Vd1) with a suitable voltage.

The setpoint signal (Sd2) for chopper driving is therefore a signal which is formed by a smaller signal being selected from the following two signals, i.e., from a signal (Sd3) which corresponds to the above described setpoint signal (St) for control of the chopper capacity, and from a signal (Sd4) which corresponds to the above described upper boundary signal (Sk) of the lamp current.

When the overall control element (Xpu) produces the above described setpoint signal (St) for control of the chopper capacity, as for example, by division of a constant which corresponds to the nominal wattage by the above described lamp voltage data (Sxv), by computing the value of the lamp current (IL) for achieving the nominal wattage, by producing the setpoint signal (St) according to this value and by similar methods, even if this is unsuitable, within the above described chopper capacity control circuit (Ud), the above described setpoint signal (Sd2) for chopper driving is hardware-limited such that the lamp current (IL) does not exceed the above described upper boundary signal (Sk) of the lamp current.

Control via the A/D converter (ADC) or the microprocessor unit (Mpu) has specifically a low operating speed (or the costs increase if the speed is increased). In the case in which, for example, a situation arises where the discharge state of the lamp has changed quickly, by delay of operation the unsuitability of the above described setpoint signal (St) for control of the chopper capacity can arise. Such current limitation function by hardware is also useful with respect to the protection of the lamp and the feed device.

On the other hand, the lamp current signal (Si) is connected via an amplifier or a buffer (Ad3), which is installed if necessary, and a diode (Dd3), to the other end of the pull-down resistor (Rd5), one end of which is connected to a ground (Gndx). Thus, a signal to be controlled (Sd5) is produced.

Furthermore, the lamp voltage signal (Sv) is compared by a comparator (Cmv) to the voltage of the reference voltage source (Vd2), which has a voltage which corresponds to the above described no-load voltage. If the lamp voltage signal (Sv) is higher than the no-load voltage, a transistor (Qd1) is shifted into the OFF state or the active state. Because a current is allowed to flow from a suitable voltage source (Vd3) via a resistor (Rd4) and a diode (Dd4) into the above described pull-down resistor (Rd5), operation is carried out such that the level of the signal (Sd5) to be controlled is increased.

If, conversely, the above described lamp voltage signal (Sv) is lower than the no-load voltage, the above described transistor (Qd1) is shifted into the ON state. This leads to a short circuit of the current from the above described voltage source (Vd3). The signal (Sd5), which is to be controlled, thus corresponds to the lamp current signal (Si).

The reason for this is that, in the above described circuit consisting of the pull-down resistor (Rd5), the diode (Dd3) and the diode (Dd4), a voltage is selected and formed in the pull-down resistor (Rd5), which is selected according to the greater signal of the anode-side signals (Sd6) and (Sd7) of the diodes.

In the comparator (Cmv), by inserting positive feedback resistors (not shown in the drawings) into its output terminal and its non-inverting input terminals, comparison operation can have hysteresis. In this way, an unintentional oscillation phenomenon when the comparison output changes can be prevented.

This arrangement promptly increases the above described signal (Sd5) which is to be controlled, if the above described lamp voltage signal (Sv) tries to exceeds the above described no-load voltage, even if there is the state in which the output current almost stops and in which the lamp current signal (Si) hardly arises. In this way, the lamp voltage (VL) is always hardware-limited essentially to less than or equal to the no-load voltage.

The setpoint signal (Sd2) for chopper driving is subjected to voltage division by a resistor (Rd2) and a resistor (Rd3) and sent to the inverting input terminal of the operational amplifier (Ade). On the other hand, the above described signal (Sd5) to be controlled is supplied to the non-inverting input terminal of the operational amplifier (Ade). Since the output signal (Sd1) of the operational amplifier (Ade) is fedback via an integral capacitor (Cd1), and a speed increasing resistor (Rd6) with the non-inverting input terminal, the operational amplifier (Ade) acts as an error integration circuit which integrates the difference between the divided voltage of the above described setpoint signal (Sd2) for chopper driving by the resistor (Rd2) and the resistor (Rd3) and the voltage of the above described signal (Sd5) which is to be controlled.

Figure 4:
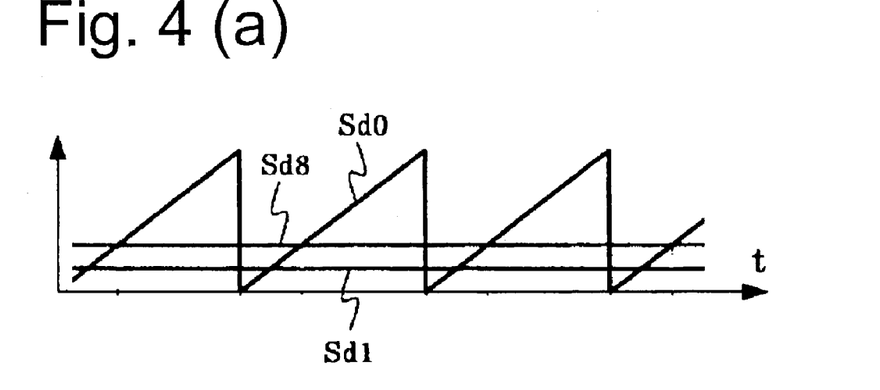

In the oscillator (Osc), a resistor (Rd0) for determining the time constant and a capacitor (Cd0) are connected to one another, and the sawtooth wave signal (Sd0) shown in FIG. 4(a) is generated. This sawtooth wave signal (Sd0) and the output signal (Sd1) of the above described error integration circuit are compared to one another by a comparator (Cmg).

In a comparison, one signal (Sd8) is compared to the sawtooth wave signal (Sd0), the signal (Sd8) being formed by the offset voltage (Vd4) being sent to the output signal (Sd1) of the above described error integration circuit.

During the interval during which the voltage of the sawtooth wave signal (Sd0) is higher than the voltage of the signal (Sd8), the gate driver signal (Sg), which reaches a high level, is produced and is output by the chopper capacity control circuit (Ud).

As described above, the signal (Sd8) is formed by a residual control deviation being added to the output signal (Sd1) of the error integration circuit. The pulse duty factor of the gate driver signal (Sg) is, therefore, provided such that it is less than or equal to a certain maximum value which is less than 100%, i.e., it is less than or equal to the maximum pulse duty factor Dxmax, even if it is assumed that the output signal (Sd1) of the above described error integration circuit is 0.

FIGS. 4(a) and 4(b) shows the relation between the output signal (Sd1) of the error integration circuit, the signal (Sd8) which is formed by a residual control deviation added, the sawtooth wave signal (Sd0), and the gate driver signal (Sg).

The gate driver signal (Sg), which has been output by the feed control circuit (Fx), is input into the gate driver circuit (Gx). As a result, a feedback control system is completed, wherein the lamp current signal (Si) and the lamp voltage signal (Sv) are fedback with the operation of the switching device (Qx).

For the arrangement of the chopper capacity control circuit (Ud) in FIG. 3, a TL494 from Texas Instruments™ or the like can be used as a commercial integrated circuit in which the operational amplifier (Ade), the oscillator (Osc), the comparator (Cmg) and the like are integrated.

The respective process before starting, during starting, in the glow discharge, in the transition to the arc discharge, and electrode heating of the light source device of the invention described in FIG. 1 having the feed control circuit (Fx1) described in FIG. 3 as the feed control circuit (Fx), and the core points of practical control are described below in a simplified manner.

Figure 6:
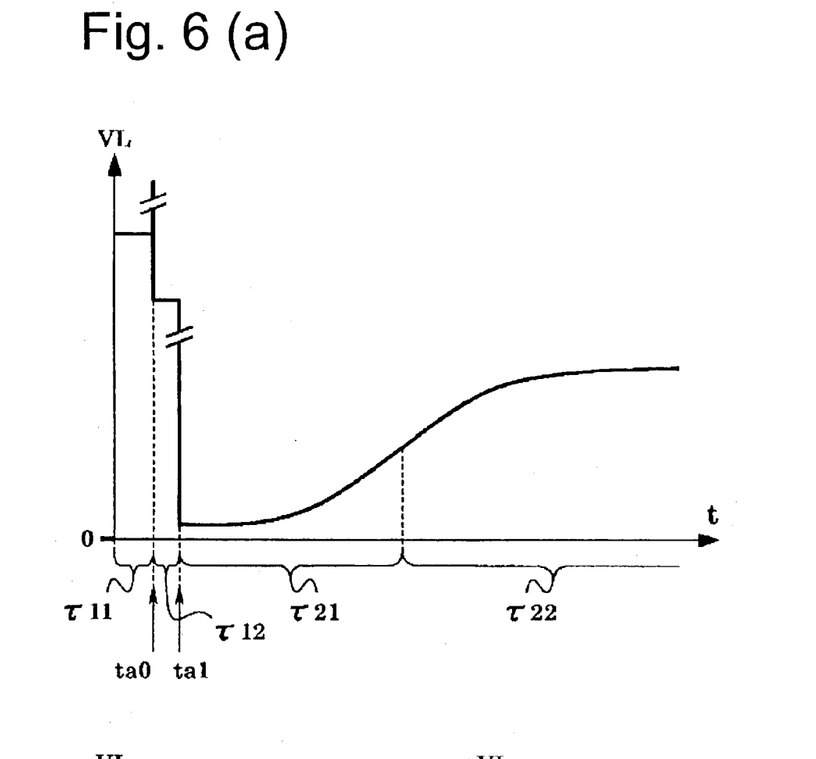
FIGS. 6a to c each show a schematic of the state of the change of the lamp voltage.

During starting of this light source device, the overall control element (Xpu sets the setpoint signals (St) for control of the chopper capacity high enough such that the upper boundary signal (Sk) of the lamp current is selected as the setpoint signal (Sd2) for chopper driving. Since, at this time, the discharge lamp (Ld) is turned off, and since the lamp current (Il) does not flow, a state is obtained in which the above described no-load voltage is produced. This state is shown schematically using the interval (τ11) as shown in FIG. 6a. FIG. 6a schematically shows the time behavior of the lamp voltage (VL).

By operation of the starter (Ui) at the instant (ta0), as described above, a high voltage is applied between the electrodes (E1, E2) and an insulation breakdown is produced. Thus a glow discharge of duration (τ12) is started. When the electrode temperature increases enough, at the time (Ta1), the discharge passes into an arc discharge.

As described above, in the transition of the lamp into an arc discharge, the lamp voltage (VL) drops quickly. The overall control element (Xpu) which determines the lamp voltage signal (Sv) via the A/D converter (Adc) can determine the rapid drop of the lamp voltage (VL). Or, as is shown using FIG. 6b, the transition of the lamp into an arc discharge can be determined by waiting until a suitable time has passed, and afterwards the rapid drop of the lamp voltage (VL) is determined in order to prepare for the case in which the lamp passes again into the arc discharge, after it has returned to a glow discharge after the transition into an arc discharge, or for the case in which the lamp after several repetitions of this process passes into the arc discharge.

When determining the transition of the lamp into the arc discharge, generally, the overall control element (Xpu) regularly determines the lamp voltage (VL), divides the adjusted setpoint wattage by the determined lamp voltage (VL), computes the current setpoint which is considered the setpoint signal (St) for control of the chopper capacity, and starts a repeating process. Instead of carrying out the previous operation for selection of the upper boundary signal (Sk) of the lamp current as the setpoint signal (Sd2) for chopper driving for a glow discharge, the setpoint signal (St) for control of the chopper capacity is set relatively high.

As described above, during the initial interval (τ21) of the arc discharge the temperature of the lamp is not yet high enough. Therefore, the current setpoint cannot be reached because the computed current setpoint exceeds the first boundary value (IL2) of the lamp current, which is set as the uppermost boundary value ILmax of the allowable lamp current. However, over time the lamp voltage increases, by which the computed current setpoint reaches a value which is less than or equal to the above described first boundary value (IL2) of the above described lamp current. Thus, it becomes possible to supply the adjusted setpoint wattage to the lamp. Afterwards, the state of the light source device changes along the nominal wattage characteristic (Fp0) shown in FIG. 2.

The overall control element (Xpu) counts down the time passing since the instant of determination of passage into the arc discharge and waits until the time necessary to achieve sufficient heating of the discharge lamp expires. In determining the progression of this time, the adjusted setpoint wattage, which is essentially regularly repeated, is divided by the determined lamp wattage (VL), by which the current setpoint is computed. Before the process of adjusting this current setpoint as the setpoint signal (St) for control of the chopper capacity, a process of changing the current setpoint to a smaller value than the current setpoint and than the comparison boundary value is inserted. In this case, however, the second boundary value (IL2) of the lamp current is used as the comparison boundary value.

In the feed device during the interval up to reaching sufficient heating of the lamp, the current boundary value is fixed at the first boundary value by this measure, and after the above described interval has passed the process of changing the current boundary value to the second boundary value which is smaller than the above described first boundary value is accomplished. Therefore, in a lamp with a low saturation lamp voltage the lamp current in steady-state operation can be limited to less than or equal to the second boundary value (IL2), and, thus, an increase of the lamp current can be prevented.

In the above described first embodiment, a case was described in which in the circuit (Uc) for producing the upper boundary signal of the lamp current the uppermost value of the lamp current Ilmax and that the upper boundary signal (Sk) of the lamp current which always corresponds to the first boundary value (IL1) of the lamp current is generated. However, the following arrangement can also be undertaken:

The circuit (Uc) for producing the upper boundary signal of the lamp current selects either the first boundary value (IL1) of the lamp current or the second boundary value (IL2) of the lamp current according to the command of the overall control element (Xpu), by which the upper boundary signal (Sk) of the lamp current is produced. During the interval until reaching sufficient heating of the lamp, the first boundary value (IL1) of the lamp current is selected, and, after this interval expires, the second boundary value (IL2) of the lamp current is selected. Thus, the upper boundary signal (Sk) of the lamp current is produced.

In the case of one such arrangement, it becomes unnecessary, before the process of computing the current setpoint by division of the determined lamp voltage (VL) and adjustment of this current setpoint as the setpoint signal (St) for control of the chopper capacity, to insert the process of changing the current setpoint to a smaller value than the current setpoint as well as the comparison boundary value.

In the first embodiment, an arrangement was undertaken in which the passage of time from the instant of determination of the transition into the arc discharge is counted, it is waited until the time necessary to achieve sufficient heating of the discharge lamp passes, and, thus, it is assessed that the heating of the discharge lamp has become sufficient. However, other processes can also be used. For example, a process for assessment by measuring the degree of change of the lamp voltage is described below in simplified terms.

Since, immediately after the transition to an arc discharge of the lamp, only a much smaller wattage is supplied than the nominal wattage, lamp heating proceeds slowly. The lamp voltage (VL) increases only slowly, as shown using the interval (τ21) in FIG. 6a, wherein the time behavior of the lamp voltage (VL) is shown in schematic form. The lamp current is at the first boundary value and is constant. However, since when the lamp wattage increases the power delivered to the lamp increases in proportion to it, the degree of increase of the lamp wattage increases over time. Further, however, if the lamp state has reached the point (Pa2) as shown in FIG. 2, wherein the relation between the lamp voltage (VL) and the lamp current (IL) is shown, the wattage supplied to the lamp also reaches the nominal wattage. Even if the lamp voltage increases starting from this time, the wattage supplied to the lamp is constant. The degree of increase of the lamp wattage decreases, therefore, over time, as the interval (τ22) according to FIG. 6a.

The overall control element (Xpu) computes the lamp wattage, determines that its value has reached essentially the nominal wattage, thus recognizes that the lamp is in the interval (τ22), traces the lamp voltage signal (Sv), measures the degree of its change by a computation, determines that its value has fallen below a given value, and can thus assess that heating of the discharge lamp is sufficient.

However, since the phenomenon shown using FIG. 6b in which the lamp after the transition into the arc discharge returns to the glow discharge, and since the phenomenon wherein mainly in the second half of the interval (τ21) and in the initial period of the interval (τ22) the lamp voltage decreases quickly, as at the time (tb1) in FIG. 6c occur, when measuring the degree of change of the lamp voltage and in the assessment of whether heating of the discharge lamp is enough or not, it is necessary to eliminate errors by these phenomena wherein the lamp voltage changes quickly. The phenomenon described in FIG. 6c arises by the discharge formation point on the lamp electrode moving from a point remote from the electrode tip to a point nearer the electrode tip or to the tip.

A second embodiment of the invention according to the second aspect is described below. The arrangement in this embodiment is based on the arrangement in the first embodiment.

When the process of changing the current setpoint to a smaller value than the current setpoint and than the comparison boundary value is inserted before the process in which the overall control element (Xpu) in the above described manner divides the adjusted setpoint wattage by the determined lamp voltage (VL) to compute the current setpoint, and sets it as the setpoint signal (St) for control of the chopper capacity, in this embodiment a function Ix(t), is used which depends as the comparison boundary value on time, while in the first embodiment the second boundary value (IL2) of the lamp current was used as the comparison boundary value.

Figure 5:
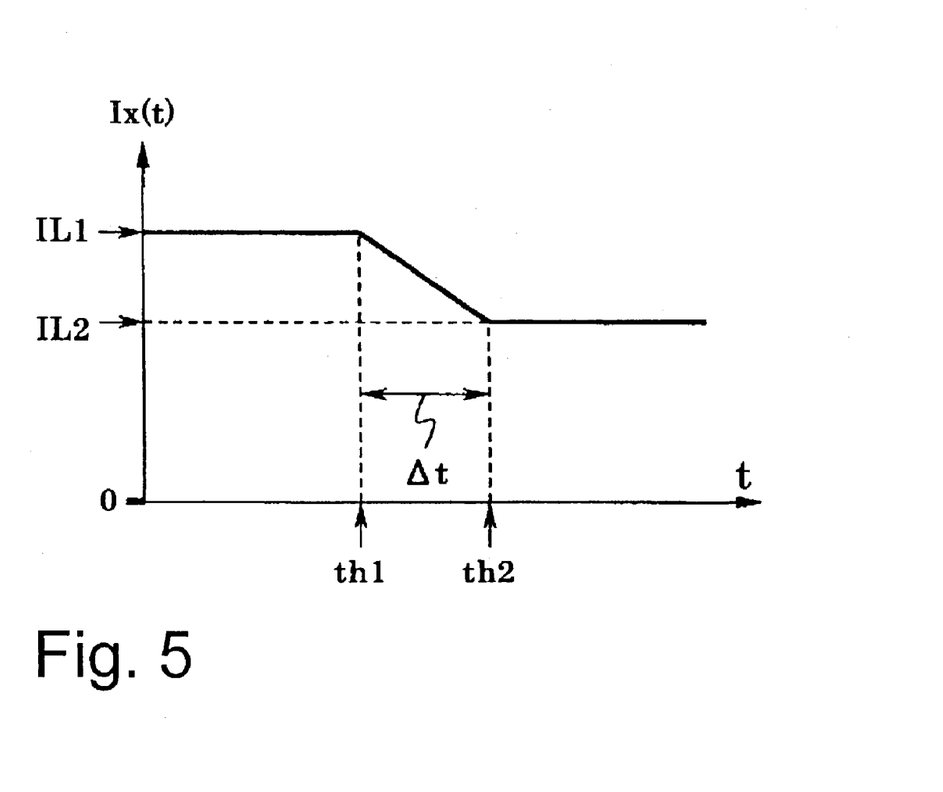
FIG. 5 shows a schematic representation of one example of the change of the current boundary value according to the second aspect of the invention.

The function Ix(t) is, as shown in FIG. 5, is identical to the first boundary value (IL1) of the lamp current before the time (th1), at which it is assessed that the heating of the discharge lamp is sufficient. Starting at the time (th2) which occurs after the time (th1) at which it is assessed that the heating of the discharge lamp is sufficient, delayed by a suitable time (Δt) which is necessary for the change, the function Ix(t) is identical to the second boundary value (IL2) of the lamp current. The interval between the time (th1) and the time (th2) is a function which changes gently from the first boundary value (IL1) of the lamp current to the second boundary value (IL2) of the lamp current. Roughly 5 seconds to 20 seconds can be set as the time (Δt) which is necessary for the change.

In the feed device, during the interval up to achieving sufficient heating of the lamp, this measure implements the process in which the current boundary value is made the first boundary value and in which the current boundary value starting at a certain time after passage of the above described interval is gradually changed to the second boundary value which is smaller than the first boundary value. Therefore, the user of the optical device can be prevented from detecting the change of radiance.

Since in the second embodiment the circuit (Uc) for producing the upper boundary signal of the lamp current is based on the first embodiment, as the uppermost value Ilmax of the lamp current the upper boundary signal (Sk) of the lamp current is produced which always corresponds to the first boundary value (IL1) of lamp current. However, the circuit (Uc) for producing the upper boundary signal of the lamp current can be arranged such that it has a D/A converter, and based on data from the overall control element (Xpu), generates an analog upper boundary signal (Sk) of the lamp current, like the setpoint signal (St) for control of the chopper capacity. By setting the time series data which correspond to the function Ix(t), in this D/A converter during the interval until reaching sufficient heating of the lamp, the current boundary value can be called the first boundary value, and the current boundary value after the interval has expired can be gradually changed to the second boundary value, which is smaller than the first boundary value.

In this arrangement, the insertion of the process of changing the current setpoint to a smaller value than the current setpoint and than the comparison boundary value before the above described process, in which by division by the determined lamp voltage (VL) the current setpoint is computed and in which it is set as the setpoint signal (St) for control of the chopper capacity, is not necessary.

In this specification, only what is most necessary in the circuit arrangement is described in order to explain the operation, function and action of the light source device of the invention. It is therefore assumed that the further details of the circuit operation described in the embodiments, for example, the polarity of the signals, the specific selection, the specific insertion and omission of the circuit components or concepts such as changes and the like, are actively implemented for purposes of facilitating the procurement of components and for reasons of economy, in the practice of building an actual device.

It is assumed that especially a device for protection of the circuit components of a feed device, such as the switching devices, such as a FET or the like, against damage factors such as a wattage exceeding a certain value, a current exceeding a certain value, overheating or the like, or a device which reduces the formation of radiated noise such as line noise which forms according to operation of the circuit components of the feed device or which prevents the resulting noise from being released to the outside, such as, for example, a snubber circuit, a varistor, a clamping diode (including the "pulse-by-pulse method"), a current limiter circuit, a "noise filter" reactance coil with a "common mode" or "normal mode", a noise filter capacitor and the like, if necessary is added to the respective part of the circuit arrangements which are described in the embodiments.

The arrangement of light source device as claimed in the invention is not limited to the circuit types described in the embodiments in the application documents. In the application documents especially a case of constant control of the lamp wattage independently of lamp voltage is centrally described. This situation is however not a necessary circumstance of the invention, but the invention also functions advantageously in the case of other control principles.

In this embodiment, a case is described in which the assessment of the determination whether lamp heating has taken place to a sufficient degree, as well as follow-up controls such as the change of the current boundary value and the like, are carried out by a microprocessor unit (Mpu). The action of the invention is also advantageously developed in a more complicated arrangement of the light source device or a simplification such that the above described microprocessor unit (Mpu) is omitted and instead of it, a simpler control circuit is used.

As set forth above, the disadvantage in the prior art wherein in a light source device with a discharge lamp with high radiance in a lamp with a low lamp saturation voltage the lamp current becomes large can be eliminated.

What we claim is:

1. Light source device having a discharge lamp with high radiance, comprising a pair of opposed electrodes connected to a feed device which starts the discharge lamp and which is used to supply the discharge current to the electrodes, wherein the feed device is a current feed controller that prevents the current flowing in the discharge lamp from exceeding a given current boundary value, the current boundary value being a first boundary value during an interval immediately after starting of the discharge lamp until sufficient heating of the discharge lamp is achieved to maintain an arc discharge state, and the current boundary value being changed to an actively set second boundary value that is smaller than the first boundary value, said controller being adapted to adjust the current so as to maintain an arc discharge which prevents the occurrence of flickering.

2. Light source device as claimed in claim 1, wherein the current feed controller is adapted to produce a gradual change when the current boundary value changes from the first boundary value to the second boundary value.

3. Feed device for starting a discharge lamp with high radiance and supplying a discharge current to the discharge lamp, wherein the feed device has a current feed controller which prevents the current flowing in the discharge lamp from exceeding a given current boundary value in a manner such that, during a time interval immediately after starting of the discharge lamp until sufficient heating of the discharge lamp is achieved to maintain an arc discharge state, the current boundary value is a first boundary value, and such that, after the time interval expires, the current boundary value is changed to an actively set second boundary value that is smaller than said first boundary value, said controller being adapted to adjust the current so as to maintain an arc discharge which prevents the occurrence of flickering.

* * * * *